(12) United States Patent
Chambers et al.

(10) Patent No.: US 8,513,340 B2
(45) Date of Patent: Aug. 20, 2013

(54) METHOD OF REDUCING CHATTER

(75) Inventors: Scott Chambers, Goshen, CT (US); Perry Reed, Matawan, NJ (US); Tara Patterson, Bradford (CA)

(73) Assignee: Georgia Gulf Corporation, Atlanta, GA (US)

( * ) Notice: Subject to any disclaimer, the term of this patent is extended or adjusted under 35 U.S.C. 154(b) by 77 days.

(21) Appl. No.: 13/082,885

(22) Filed: Apr. 8, 2011

(65) Prior Publication Data

US 2012/0029126 A1 Feb. 2, 2012

Related U.S. Application Data

(60) Provisional application No. 61/322,502, filed on Apr. 9, 2010.

(51) Int. Cl.
*C08K 5/58* (2006.01)
*C07F 7/22* (2006.01)

(52) U.S. Cl.
USPC .......................................... 524/180; 524/181

(58) Field of Classification Search
USPC ....................................................... 524/180
See application file for complete search history.

(56) References Cited

U.S. PATENT DOCUMENTS

| | | |
|---|---|---|
| 3,189,575 A | 6/1965 | Horn et al. |
| 3,803,083 A | 4/1974 | Brecker |
| 3,925,246 A | 12/1975 | Coates et al. |
| 3,933,741 A * | 1/1976 | Larkin et al. ................... 524/181 |
| 3,953,385 A * | 4/1976 | Dworkin et al. ................ 521/89 |
| 4,010,138 A | 3/1977 | Ejk et al. |
| 4,087,222 A | 5/1978 | Noel |
| 4,273,885 A | 6/1981 | Dominguez et al. |
| 4,350,778 A | 9/1982 | Dominguez et al. |
| 4,350,779 A | 9/1982 | Dominguez et al. |
| 4,359,540 A | 11/1982 | McEntire et al. |
| 4,362,824 A | 12/1982 | Dominguez et al. |
| 4,401,424 A | 8/1983 | De Zen |
| 4,552,907 A | 11/1985 | Sato et al. |
| 4,560,716 A | 12/1985 | Sato et al. |
| 4,822,833 A | 4/1989 | Zappia et al. |
| 4,988,751 A * | 1/1991 | Chambers et al. ............ 524/181 |
| 5,030,676 A | 7/1991 | Wallen |
| 5,100,946 A | 3/1992 | Hung et al. |
| 5,340,862 A | 8/1994 | Silbermann et al. |
| 5,405,823 A | 4/1995 | Fijimura et al. |
| 5,518,662 A * | 5/1996 | Bae et al. ................... 252/400.1 |
| 5,688,890 A | 11/1997 | Ishiguro et al. |
| 5,847,016 A | 12/1998 | Cope |
| 6,573,318 B2 | 6/2003 | Duvall et al. |
| 6,777,467 B2 | 8/2004 | Duvall et al. |
| 2006/0167190 A1 | 7/2006 | Trabesinger et al. |
| 2010/0267873 A1 | 10/2010 | Azimipour et al. |

* cited by examiner

*Primary Examiner* — Hui Chin
(74) *Attorney, Agent, or Firm* — Hunton & Williams LLP

(57) ABSTRACT

A method for reducing chatter in an extrusion process, which includes the steps of preparing an extrusion composition by combining a polymer composition with a chatter-reducing formulation, and extruding the extrusion composition to provide a substantially continuous extrudate. The chatter-reducing formulation comprises an alkyltin mercaptide and dibutyltin dilaurate. The resultant extrudate exhibits reduced chatter, which is categorized according to the Reed Scale as less than or equal to 2.

19 Claims, 2 Drawing Sheets

METHOD OF REDUCING CHATTER

The present invention claims priority to U.S. Provisional Application No. 61/322,502 filed Apr. 9, 2010, the contents of which are incorporated herein by reference in their entirety.

BACKGROUND

1. Field of the Art

The present embodiments relate to a method for reducing chatter in an extrusion process.

2. Description of Related Art

One of the challenges faced with polymer profile extrusion, particularly at higher outputs, is so-called "chatter" caused by binding and hesitation of the extrudate as it passes through the calibrator/sizers. Repeated binding and release of the extrudate in the calibrator/sizers can leave lines and/or marks along the profile surface. At lower extrusion rates, it may be possible to adjust extruder conditions to solve the problem. At higher output rates chatter can become more pronounced and more difficult to control via extrusion process adjustments.

Heat stabilizers are commonly used in PVC formulations to improve the thermal stability of the PVC during processing. Heat stabilizers also protect the PVC against long-term thermal degradation. Examples of commercially available stabilizers include, for example, methyltin mercaptide stabilizers, and butyltin mercaptide stabilizers. Some heat stabilizers also help to improve chatter in PVC extrusion processes.

SUMMARY

In view of the foregoing, one or more embodiments include an improved method for producing extrudates with reduced chatter.

In accordance with an embodiment, a method for reducing chatter in an extrusion process, includes the steps of preparing an extrusion composition by combining a polymer composition with a chatter-reducing formulation, and extruding the extrusion composition to provide a substantially continuous extrudate. The chatter-reducing formulation comprises an alkyltin mercaptide and dibutyltin dilaurate. The resultant extrudate has a Reed Scale chatter measurement of less than or equal to 2.

BRIEF DESCRIPTION OF THE DRAWINGS

In order to facilitate a fuller understanding of the exemplary embodiments, reference is now made to the appended drawing figures. These drawings should not be construed as limiting, but are intended to be exemplary only.

DESCRIPTION OF THE INVENTION

Figure 1:
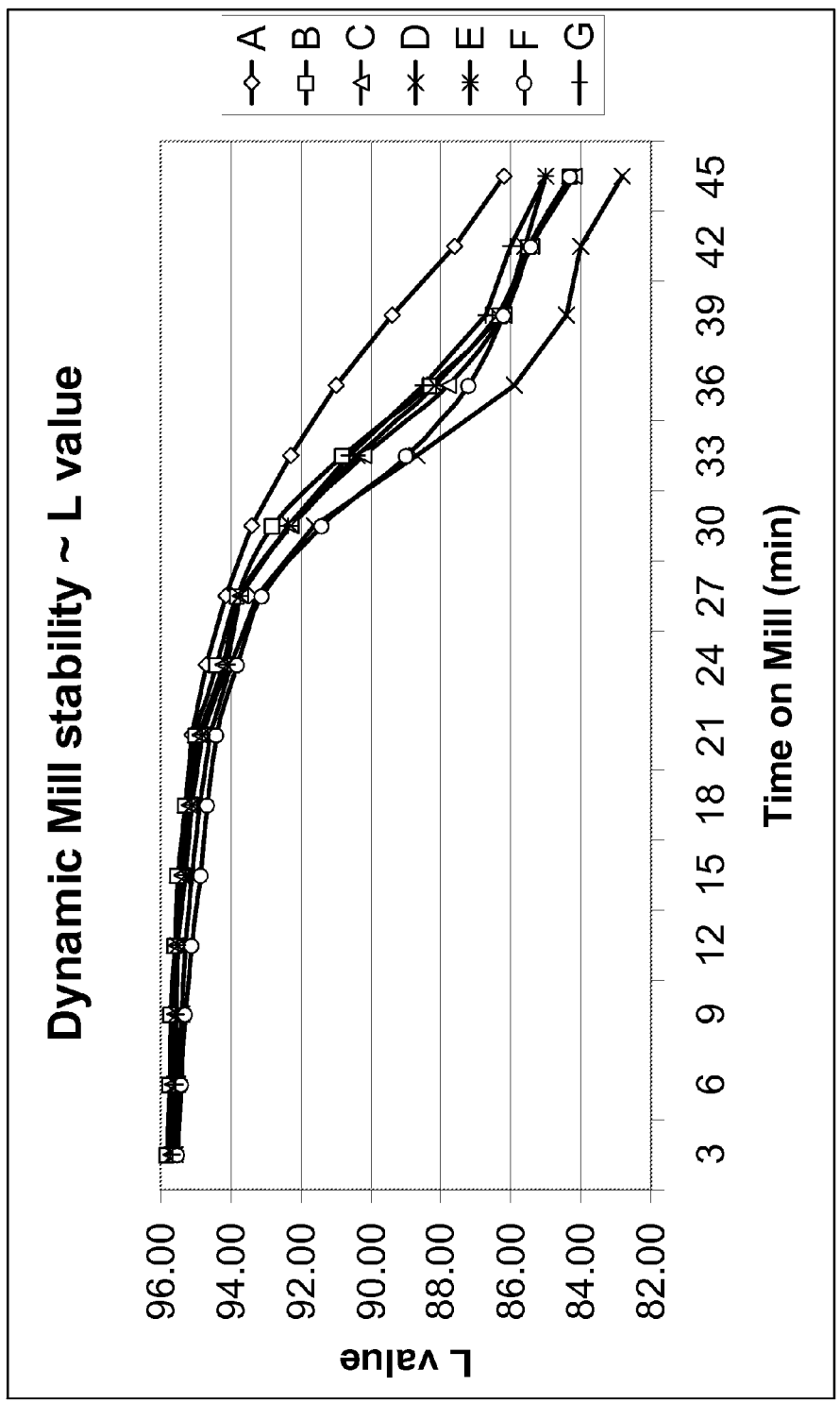
FIG. 1 illustrates the dynamic mill stability (L value) of exemplary PVC extrudates made in accordance with the embodiments described herein, as compared to control samples.

The following description is intended to convey a thorough understanding of the embodiments by providing a number of specific embodiments and details involving a method for reducing chatter. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the method of the various exemplary embodiments described herein includes adding a chatter-reducing formulation to a polymer composition to provide an extrusion composition, extruding the extrusion composition to produce a substantially continuous extrudate. The resulting extrudate exhibits a significant reduction in the amount of chatter; in some embodiments the extrudate exhibits substantially no signs of chatter.

According to exemplary embodiments, the polymer composition includes one or more polymers. Any polymer that requires heat stabilization with organotin or mixed metal stabilizers may be used in the embodiments. Exemplary polymers include halogen-containing organic polymers, such as those which contain chlorine atoms bonded to the polymer chain. These polymers may be homopolymers including polyvinyl chloride-type polymers, e.g., polyvinyl chloride. These polymers may also include copolymers formed by the copolymerization of vinyl chloride with other ethylenically unsaturated monomers, such as, for example, compositions that contain polymerizable carbon-to-carbon double bonds and may include alpha olefins such as ethylene, propylene, and 1-hexene; acrylates, such as acrylic acid, ethyl acrylate, acrylonitrile; vinyl monomers, such as styrene, vinyl acetate; and/or maleates, such as maleic acid, maleic anhydride, maleate esters. Exemplary polymers include, but are not limited to, polyvinyl chloride, chlorinated polyvinyl chloride, polyvinylidene chloride, chlorinated polyethylene, polyvinylidene fluoride, and copolymers of vinyl chloride and polyvinylidene chloride. The polymer may be a blend or combination of one or more polymers. One having ordinary skill in the art will recognize polymers suitable for use in the exemplary embodiments. In an exemplary embodiment, the polymer is polyvinyl chloride (PVC).

According to the embodiments, the extrusion composition may contain from about 50% to about 99.5% (by weight) polymer. In an exemplary embodiment, the extrusion composition includes from about 80% to about 90% (by weight) polymer. The extrusion composition may also contain one or more additional ingredients as necessary or desired. For example, the extrusion composition may contain dyes, pigments, flameproofing agents, internal and external lubricants, impact modifiers, processing aids, blowing agents, fillers, plasticizers, and/or other additives.

According to exemplary embodiments, a chatter-reducing formulation is added to the polymer composition to provide an extrusion composition. The chatter-reducing formulation may help reduce or eliminate chatter in the extrusion process. In addition, the chatter-reducing formulation may provide better UV stability, lower odor, and lower occurrences of pinking or streaking.

In an exemplary embodiment, the chatter-reducing formulation contains an alkyltin mercaptide and dibutyltin dilaurate.

In an exemplary embodiment, the alkyltin mercaptide may provide the improved initial and long-term stability, such as when used for processing of PVC. The alkyltin mercaptide may be any alkyltin mercaptide, including those commonly used as heat stabilizers. As used herein, "alkyltin mercaptide" and the like (e.g., "butyltin mercaptide") represents a blend of mono- and di-substituted tin mercaptides, which can be represented by the following structures:

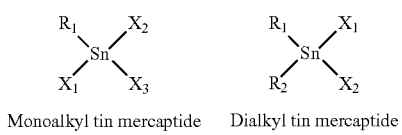

Monoalkyl tin mercaptide    Dialkyl tin mercaptide

Where $R_1$ and $R_2$ represent an alkyl group, and $X_1$, $X_2$, and $X_3$ represent either a mercaptan or sulfide sulfur in which no carbon atom is attached to the sulfur atom. In exemplary embodiments, from about 0% to about 50% of the $X_1$, $X_2$, and/or $X_3$ constituents are sulfide sulfur.

Exemplary alkyl groups include, but are not limited to, methyl, butyl, octyl, and dodecyl, and mixtures and combinations thereof. Exemplary mercaptans include, but are not limited to: straight chain alkyl mercaptans such as lauryl mercaptan; mercaptoesters, such as 2-ethylhexyl thioglycolate (2EHTG) and 2-mercaptoethyl tallate (2MET); and any mixtures and combinations thereof.

The Mono:Di ratio of the alkyltin mercaptide may range between 1:99 to 99:1, depending on any necessary or desired application conditions. For example, an alkyltin mercaptide having a high Mono:Di ratio (high mono content), e.g., greater than 50:50 may provide an extrudate having better initial color. An alkyltin mercaptide having a low Mono:Di ratio (high di content), e.g., less than 50:50, may provide an extrudate having better long term color stability. In some exemplary embodiments, the chatter-reducing formulation may have an alkyltin mercaptide having a high Mono:Di ratio ranging from about 51:49 to about 99:1, or from about 70:30 to about 99:1. In some exemplary embodiments, the chatter-reducing formulation may have an alkyltin mercaptide having a low Mono:Di ratio ranging from about 49:51 to about 1:99, or from about 30:70 to about 1:99. One having ordinary skill in the art, after reviewing this disclosure, would understand that the ratio may be modified depending on the intended results, and would understand how to determine a suitable Mono:Di ratio for a particular application.

In an exemplary embodiment, the alkyltin mercaptide may be a blend of two or more alkyltin mercaptides. For example, the alkyltin mercaptide may be a blend of methyltin mercaptide and butyltin mercaptide. One having ordinary skill in the art, having read this disclosure, would understand the various mixtures or combinations that could be used in the embodiments.

In an exemplary embodiment, the chatter-reducing formulation also contains dibutyltin dilaurate (DBTDL). It is believed that the addition of DBTDL to the formulation may improve lubricity, minimize the occurrence of chatter, and produce smooth flow when the polymer is extruded. The DBTDL also may improve the weatherability of the final product and the odor generated during extrusion.

An exemplary chatter-reducing formulation has a weight ratio of alkyltin mercaptide to DBTDL ranging from about 1:99 to about 99:1, such as, for example, from about 95:5 to about 75:25. One having ordinary skill in the art, having read this disclosure, would understand that the ratio may be modified depending on the intended results, and would understand how to determine a suitable ratio for a particular application.

In exemplary methods, the alkyltin mercaptide and DBTDL may be added to the extrusion composition simultaneously, such as, for example, being provided as a blend or admixture. In some exemplary embodiments, the alkyltin mercaptide and DBTDL or may be added to the extrusion composition separately and/or sequentially. It will be understood that adding the chatter-reducing formulation to the extrusion composition may be accomplished by various methods, and at various rates, as necessary and/or desired.

In exemplary methods, the chatter-reducing formulation is added to the extrusion composition in an amount sufficient to reduce the chatter during the extrusion process and provide heat stability. In an exemplary embodiment, the chatter-reducing formulation is added in an amount ranging from about 0.5 parts to about 5.0 parts by weight per hundred parts resin (phr). In an exemplary embodiment, the chatter-reducing formulation is added in an amount ranging from about 1.0 phr to about 1.6 phr. In an exemplary embodiment, the chatter-reducing formulation is added in an amount ranging from about 1.3 phr to about 1.5 phr.

The extrusion composition may be processed in an extruder to produce an extrudate. Extrusion processes and their components are well known. For example, some exemplary extrusion processes and apparatuses are described in one or more of the following patents: U.S. Pat. No. 4,401,424; U.S. Pat. No. 4,087,222; U.S. Pat. No. 5,508,103; U.S. Pat. No. 5,847,016; U.S. Pat. No. 5,538,777; U.S. Pat. No. 6,167,657; U.S. Pat. No. 6,869,211; the contents of which are incorporated herein by reference in their entirety, respectively. Any known or later developed extrusion process may be used with this method. One having ordinary skill in the art will understand extrusion processes that are suitable for use in the exemplary embodiments. In an exemplary embodiment, the extrusion process may be operated at higher output rates, where chatter may be more prevalent.

In an exemplary embodiment, the method has reduced chatter or no chatter, when compared to a similar method that does not use the chatter-reducing formulation. In some embodiments, chatter can be reduced to some extent with adjustment of various process conditions such as, for example, slowing line speed, reducing vacuum pressure on the sizing tank, and/or altering water temperature, etc. One having ordinary skill in the art would understand the various methods of reducing chatter by adjusting extrusion process conditions. However, it has been found that extrusion processes operating by the methods described herein more consistently operate with little to no chatter, and require significantly less process adjustment to maintain the reduced chatter levels. The methods described herein also may have one or more of the following features: lower cost, better UV stability, lower odor, reduced occurrences of separation and/or precipitation, reduction or elimination of pinking.

Test Method: Reed Scale

The Reed Scale is a visual test method used to quantify the amount of chatter provided by an extrusion process. According to this test method, the extrudate is observed with the naked eye as it exits the calibrator/sizers/cooling tank for signs of chatter marks, and vibration is observed both visually and by touching/handling the extrudate as it leaves the calibrators/sizers/cooling tank. The extrudate is classified according to the following scale:

TABLE I

Reed Scale

| Reed Scale Level | Qualitative Description |
| --- | --- |
| 0 | No visible chatter marks on extrudate. Smooth processing through extruder and calibrator. |
| 1 | No visible chatter marks on extrudate. Slight binding within the calibrator/sizer causes the extrudate to vibrate/hum. |

TABLE I-continued

Reed Scale

| Reed Scale Level | Qualitative Description |
|---|---|
| 2 | No visible chatter marks on extrudate. More pronounced vibration of the extrudate causes "jerking" through the calibrator. |
| 3 | Light chatter marks are visible on one or more surfaces of the extrudate. More pronounced vibration of the extrudate causes "jerking" through the calibrator. |
| 4 | Heavier chatter marks are visible on one or more surfaces of the extrudate - chatter marks are deeper than light chatter marks and are readily apparent at arms length. More pronounced vibration of the extrudate causes "jerking" through the calibrator. |
| 5 | Very heavy chatter marks are visible on one or more surfaces of the extrudate - chatter marks are deeper than heavy chatter marks and are readily apparent at a greater distance from the extruded profile. Vibration of the extrudate is audible from about 5-10 feet away. Vibration may cause movement of downstream equipment, sometimes visible movement. |

By way of example, in some industries, extruded profiles having a Reed Scale greater than 2 (e.g., visible chatter marks) are not sellable, and are scrapped as quality defects. Process inefficiency is caused by scrapping product, and/or by the other process conditions caused by higher chatter levels. For example, a Reed Scale level of 1 or 2 may indicate that a process condition should be modified to prevent or reduce chatter. As the Reed Scale increases, the urgency of the process adjustment may increase, particularly if product is going to be scrapped. It is likely that at a Reed Scale of 5, the process is so unstable that it must either be shut down or slowed down.

Example 1

Sample PVC formulations A-H were prepared, having the heat stabilizer or chatter-reducing formulations provided in Table II below. Examples A-D (control samples) included commercially-available heat stabilizers. Examples F and G had an exemplary butyltin mercaptide-dibutyltin dilaurate chatter-reducing formulation ("butyltin mercaptide-DBTDL"), as described herein, having a weight ratio (butyltin mercaptide to DBTDL) of 85:15. Examples E and H had an exemplary high grade butyltin mercaptide-DBTDL stabilizer, as described herein, having a weight ratio of 85:15.

TABLE II

Example 1 Sample Formulations

| Sample | Stabilizer/Chatter-Reducing Formulation | |
|---|---|---|
| A | Standard Heat Stabilizer | 1.0 phr |
| B | Methyltin Mercaptide Stabilizer | 1.2 phr |
| C | High-Grade Butyltin Mercaptide Stabilizer | 1.2 phr |
| D | Butyltin Mercaptide Stabilizer | 1.2 phr |
| E | Chatter-reducing formulation: High-grade butyltin mercaptide - DBTDL | 1.2 phr |
| F | Chatter-reducing formulation: Butyltin mercaptide - DBTDL | 1.2 phr |
| G | Chatter-reducing formulation: Butyltin mercaptide - DBTDL | 1.3 phr |
| H | Chatter-reducing formulation: High-grade butyltin mercaptide - DBTDL | 1.3 phr |

Torque rheometry (Brabender® fusion and degradation) was measured for each sample, according to ASTM D2538. Results are shown in Table III, below. The results indicate that the samples containing the exemplary chatter-reducing formulations had comparable torque rheometry to the control samples.

TABLE III

Torque Rheometry

| | Sample Extrusion: | | | | |
|---|---|---|---|---|---|
| Brabender Fusions | A | E | F | G | H |
| Fusion Time (s) | 92 | 75 | 69 | — | — |
| Minimum Torque (m*g) | 1245 | 1196 | 1138 | — | — |
| Maximum Torque (m*g) | 2192 | 2187 | 2174 | — | — |
| Brabender Degradations (min) | 12.6 | | | 12.0 | 12.0 |

Figure 2:
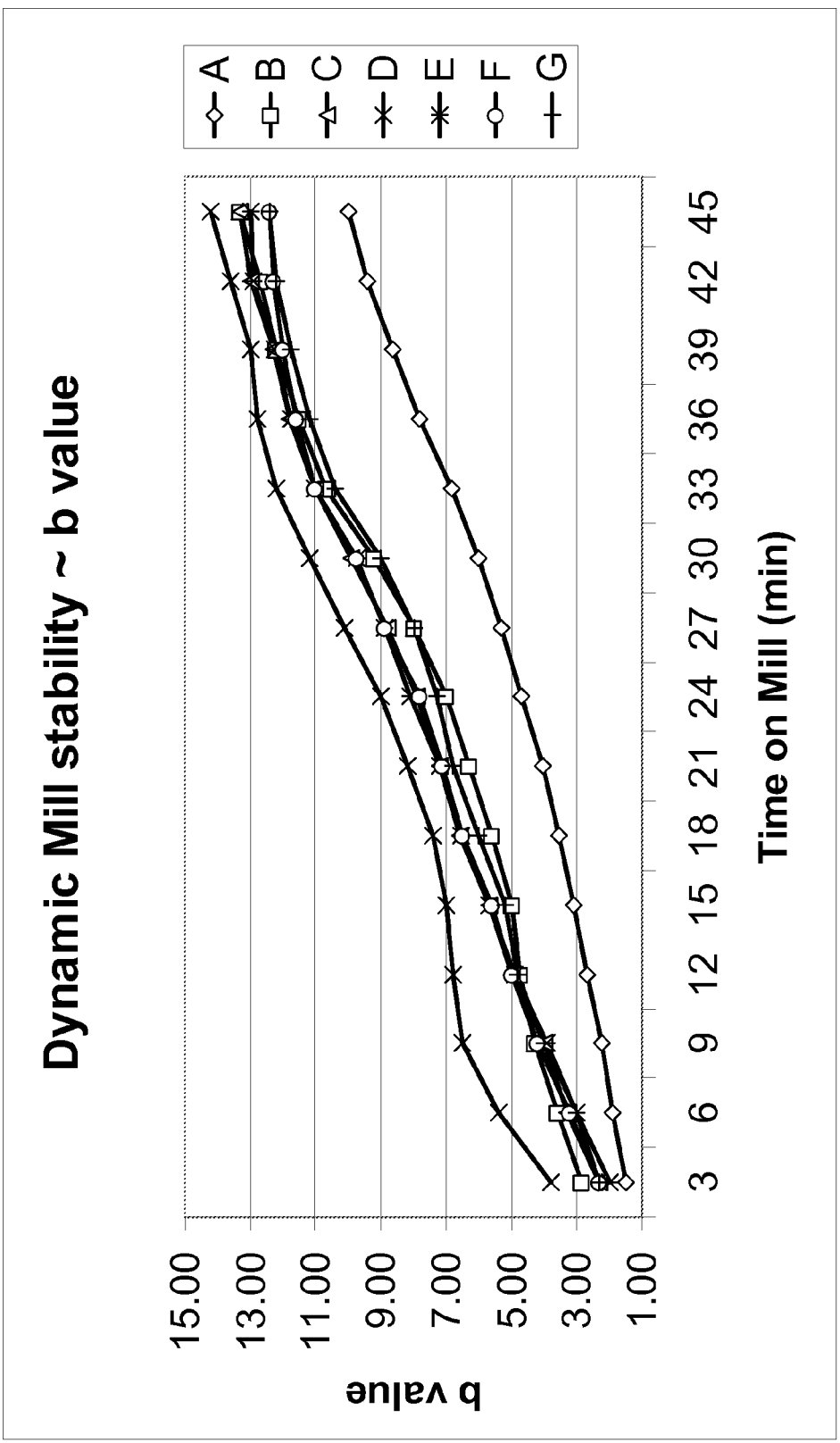
FIG. 2 illustrates the dynamic mill stability (b value) of exemplary PVC extrudates, made in accordance with the embodiments described herein, as compared to control samples.

Dynamic thermal stability was measured for each sample. FIG. 1 shows the L value (light/dark color component) of samples A-G over time, where a higher (more positive) value indicates that the extrudate has a lighter color, and a lower (more negative) value indicates that the extrudate has a darker color. FIG. 2 shows the b value (the yellowness color component) of samples A-G over time, where a higher (more positive) value indicates that the extrudate has a more yellow color over time, and a lower (more negative) value indicates that the extrudate is less yellow. The change in color (darker, or yellower) indicates the degradation of the polymer composition over time. The results for the samples containing chatter-reducing formulations are within the ranges exhibited by products containing commercially available heat stabilizer formulations; in some instances showing better stability than samples using commercial stabilizers. The above results indicate that the chatter-reducing formulation may replace current heat stabilizer formulations, without negatively impacting the stability of the extrudate.

Larger batches (1100 kg) of the samples were prepared and extruded through a commercial extruder to evaluate chatter. When compared to samples containing control stabilizers, the extrusion compositions having the exemplary chatter-reducing formulations produced similar results regarding the elimination of chatter and resulted in an extruded part having a smooth finish.

The results of the process trial were positive in that the material made with the exemplary chatter-reducing formulation processed well with no signs of chatter. The processing was comparable to that of the material made with the commercially available heat stabilizers. The temperature ranges and pressure ranges of the extruder zones during processing as well as die zone temperature ranges, process speed ranges and torque readings were comparable to the parameters of the standard material. Three tests were run and all produced the same results.

In addition to the process parameters, color was also assessed from the material produced, and all readings were within allowable deviations from that of the control samples. Odor was qualitatively assessed for each of the samples. Odor of the samples containing the exemplary chatter-reducing formulations were observed as being sweeter and less offensive than the control samples.

Example 2

Sample PVC extrusion compositions were prepared having one of the heat-stabilizer or chatter-reducing formulations provided in Table IV below. The heat stabilizer or chatter-reducing formulation was added to the PVC extrusion composition at a rate of 1.30 phr. Examples J and K had an exemplary butyltin mercaptide-DBTDL chatter-reducing formulation, as described herein, having a weight ratio (butyltin mercaptide to DBTDL) of 85:15.

TABLE IV

Example 2 Formulations

| Sample | Stabilizer/Chatter-Reducing Formulation |
|---|---|
| J | Butyltin-2EHTG (High Di) + DBTDL |
| K | Butyltin-2EHTG (High Mono) + DBTDL |
| L | Octyltin-2EHTG |
| M | Butyltin-2EHTG |
| N | Methyltin-2EHTG |

The sample PVC extrusion compositions were fed through an extruder running under the conditions provided in Table V below.

TABLE V

Example 2 Extruder Conditions

| Amps | 19-22 |
|---|---|
| Screw RPM | 900 |
| Feeder RPM | 500 |
| Pressure | 7.50-8.50 tons/sq. in. |
| Barrel Zone Set Temps: | |
| Zone 1 | 365° F. |
| Zone 2 | 380° F. |
| Zone 3 | 415° F. |
| Screw Oil Set Temp | 315° F. |
| Die Zone Set Temps: | |
| Zone 1 | 325° F. |
| Zone 2 | 390° F. |

The extrusion compositions were extruded through the die, and the process was allowed to stabilize for approximately 60 minutes. An observer monitored the extrusion process and resulting sample extrudates, respectively, and classified each sample extrudate according to the Reed Scale. The results are summarized in Table VI below.

TABLE VI

Example 2 Reed Scale

| Sample | Reed Scale |
|---|---|
| J | 0 |
| K | 0 |
| L | 2 |
| M | 3 |
| N | 3 |

As shown in Table VI above, the samples that included the chatter-reducing formulations of the exemplary embodiments showed no chatter. In contrast, the samples that included commercially available heat stabilizing formulations all exhibited some level of chatter.

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than a restrictive sense.

What is claimed is:

1. A method for reducing chatter in an extrusion process, comprising:
preparing an extrusion composition comprising a polymer composition;
extruding the extrusion composition through an extruder and a calibrator to provide a substantially continuous extrudate;
detecting at least one of chatter marks, jerking, and vibration of the extrudate as the extrudate exits the calibrator; and
adding a chatter reducing formulation that comprises alkyltin mercaptide to the extrusion composition in response to detecting the at least one of chatter marks, jerking and vibration.

2. The method of claim 1, wherein the chatter reducing formulation further comprises dibutyltin dilaurate.

3. The method of claim 2, wherein the alkyltin mercaptide comprises a mixture of two or more alkyltin mercaptides.

4. The method of claim 2, wherein the weight ratio of alkyltin mercaptide to dibutyltin dilaurate in the chatter-reducing formulation is from about 95:5 to about 75:25.

5. The method of claim 2, wherein the alkyltin mercaptide and dibutyltin dilaurate are simultaneously added to the polymer composition.

6. The method of claim 2, wherein the alkyltin mercaptide and dibutyltin dilaurate are added sequentially to the polymer composition.

7. The method of claim 2, wherein an admixture of the alkyltin mercaptide and dibutyltin dilaurate is added to the polymer composition.

8. The method of claim 2, wherein the alkyltin mercaptide comprises a blend of mono- and di-alkyl-substituted tin mercaptides which are represented by the following structures:

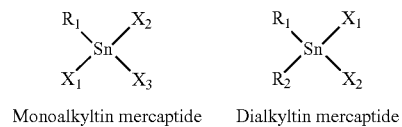

Monoalkyltin mercaptide   Dialkyltin mercaptide where $R_1$ and $R_2$ represent an alkyl group, and $X_1$, $X_2$, and $X_3$, independently represent a mercaptan or a sulfide sulfur.

9. The method of claim 8, wherein the alkyl group is selected from: methyl, butyl, octyl, and dodecyl group.

10. The method of claim 8, wherein the mercaptan is selected from: a straight chain alkyl mercaptan, 2-ethylhexyl thioglycolate, 2-mercaptoethyl tallate, and any mixture or combination thereof.

11. The method of claim 8, wherein the ratio of mono- to di-alkyl-substituted tin mercaptides is greater than 50:50.

12. The method of claim 8, wherein the ratio of mono- to di-alkyl-substituted tin mercaptides is less than 50:50.

13. The method of claim 2, wherein the chatter-reducing formulation is provided in an amount ranging from about 1.0 parts to about 1.6 parts by weight per hundred parts resin.

14. The method of claim 2, wherein the polymer composition comprises a halogen-containing polymer or copolymer.

15. The method of claim 2, wherein the polymer composition comprises a polyvinylchloride polymer or copolymer.

16. The method of claim 1, further comprising causing the extrudate to achieve a Reed Scale Level of less than or equal to 2.

17. The method of claim 1, further comprising causing the extrudate to achieve a Reed Scale Level of less than or equal to 1.

18. The method of claim 2, further comprising causing the extrudate to achieve a Reed Scale Level of less than or equal to 2.

19. The method of claim 2, further comprising causing the extrudate to achieve a Reed Scale Level of less than or equal to 1.

* * * * *